United States Patent [19]

Hampton et al.

[11] 4,450,558

[45] May 22, 1984

[54] METHOD AND APPARATUS FOR ESTABLISHING FRAME SYNCHRONIZATION

[75] Inventors: Dean A. Hampton, Watertown; Christian C. Jacobsen, Brookfield; Gary A. Profet, Watertown, all of Conn.

[73] Assignee: General Datacomm Industries, Inc., Danbury, Conn.

[21] Appl. No.: 224,338

[22] Filed: Jan. 12, 1981

[51] Int. Cl.³ .............................................. H04J 3/06
[52] U.S. Cl. .................................. 370/106; 375/109; 375/114
[58] Field of Search ............... 370/100, 103, 105, 106; 371/42, 46; 375/106, 113, 114, 116, 109

[56] References Cited

U.S. PATENT DOCUMENTS

| | | | |
|---|---|---|---|
| 3,729,590 | 4/1973 | Widl et al. | 370/106 |
| 3,798,378 | 3/1974 | Epstein | 370/106 |
| 3,963,869 | 6/1976 | Caldwell | 370/100 |
| 4,002,846 | 1/1977 | Barbier | 370/105 |
| 4,022,973 | 5/1977 | Stackhouse et al. | 375/114 |
| 4,110,558 | 8/1978 | Kageyama et al. | 375/108 |
| 4,213,011 | 7/1980 | Hoelzl et al. | 370/106 |
| 4,276,642 | 6/1981 | Siglow et al. | 370/106 |
| 4,298,987 | 11/1981 | Stattel et al. | 375/116 |
| 4,322,844 | 3/1982 | Fellinger et al. | 370/84 |

*Primary Examiner*—Robert L. Griffin
*Assistant Examiner*—Stephen Chin
*Attorney, Agent, or Firm*—Pennie & Edmonds

[57] ABSTRACT

A synchronization technique in which the frame used for synchronization is different from that used for normal data communiction and contains few if any bits other than those used to establish synchronization. At the beginning of data communication, the synchronization frame is stored in one of a pair of memories and this frame is read out of the memory onto a communication channel between the local and remote stations. At the same time, the other memory is used to store the frame that is normally used for data communication. When synchronization is established between the local and remote stations, signal generation shifts from the first memory to the second; and the second memory immediately begins to produce the channel select and overhead signals needed for data communication. Illustratively, the synchronization frame contains less than one hundred bits and in a preferred embodiment a total of forty-eight bits are used for synchronization. As a result, synchronization can be achieved much more quickly than in systems where three full data frames must be transmitted to achieve synchronization. Moreover, since few, if any, of the bits present in the synchronization frame are customer-originated data bits or EIA-type control signals, false synchronization problems are avoided.

19 Claims, 4 Drawing Figures

METHOD AND APPARATUS FOR ESTABLISHING FRAME SYNCHRONIZATION

CROSS REFERENCES TO RELATED APPLICATIONS

This application is related to the following concurrently filed applications: "Automatic Framing in Time Division Multiplexer", U.S. Ser. No. 224,339; "Method and Apparatus for Overhead Signaling", U.S. Ser. No. 224,335; "Method and Apparatus for Interleaving Control Signals", U.S. Ser. No. 224,337; and "Method and Apparatus for Distributing Control Signals", U.S. Ser. No. 224,340. Each of these applications is assigned to General DataComm Industries, Inc. and is incorporated herein by reference.

TECHNICAL FIELD

This relates to a method and apparatus for establishing synchronization between two terminals in a time division multiplexer (TDM) communication system.

BACKGROUND ART

In a typical time division multiplexer (TDM) system, a transmitter samples pulse signals of relatively low pulse repetition frequency from various data sources or channels and interleaves them with one another to form an aggregate data stream that is transmitted by a high speed aggregate channel to a remote receiver. Ordinarily, the TDM transmitter inserts the signals representative of a single bit or a single character in a single time slot in the aggregate data stream and interleaves the signals from different channels on a bit-by-bit or character-by-character basis so that adjacent time slots contain signals from different channels. However, different size blocks of signals can be used if desired. At the receiver, the individual bits or characters are separated from one another and allocated to various low frequency data channels similar to those at the transmitter.

To permit proper decoding of the data stream at the receiver, the transmitter interleaves the signals from the various data channels in accordance with a fixed schedule which it repeats endlessly and the receiver uses the same schedule to decode the data stream. Each cycle of the schedule is called a frame or an aggregate frame. In addition to data signals, each frame ordinarily inclues synchronization signals called frame sync words and various control signals, both for individual channels and for the entire TDM system. Typically, the synchronization and control signals take up a small portion (less than 5%) of the total frame which is referred to as the overhead. To simplify the generation of the signals used to select the particular data channel from which a bit or character is to be transmitted, it is customary to sample the data channels in a fixed pattern which is repeated numerous times within each frame. Each such cycle of repetition is called a subframe.

In the prior art, a portion of each frame is typically assigned to the transmission of one or more frame sync words which are typically located in a contiguous portion of the frame near its beginning or end. At the beginning of data transmission, several frames are transmitted from the local station to the remote station solely for the purpose of establishing synchronization using these frame sync words. At the remote station a frame sync word detector scans the incoming bit stream, testing every bit and its contiguous bits for the presence of the predetermined bit pattern which constitutes a frame sync word. If this pattern is detected in one frame, the remote station then tests one or more successive frames for the presence of this pattern at the same place in the frame; and upon detecting this pattern as many times as required by the system protocol, acknowledges that it is in sync with the transmitting station. Typically, three such frames are required in the prior art in order to achieve synchronization and the length of each frame sync word is five to seven bits. However, because each frame may be thousands of bits long, the total time required to establish synchronization is appreciable. In addition, in some systems in which data signals or customer-originated EIA-type control signals are transmitted in the frame along with the frame sync word, the TDM systems has no control over the bit patterns that may occur in the frame. As a result, there is considerable likelihood that a series of contiguous data or control signals received at the remote station will have the same bit pattern as the frame sync word and that such a series of data or control signals will be mistakenly recognized at the remote station as the frame sync word. Such false synchronization will only be detected after the loss of considerable time where the bit pattern fails to repeat itself in subsequent frames. While such false sync problems can be avoided by clamping the data signals to exclusively one polarity, the time required to achieve synchronization is still quite long; and, when the data signals are unclamped, data or synchronization may be lost because of switching transients.

DISCLOSURE OF THE INVENTION

In order to decrease the time required to establish synchronization, to minimize the risk of false synchronization and to improve data transmission efficiency, we have devised a synchronization technique in which the frame used for synchronization is different from that used for normal data communication and contains few if any bits other than those used to establish synchronization. To permit the use of such a frame synchronization technique, we use a frame generator containing a pair of memories. These memories may either be two physically separate memories or they may be two portions of a partitioned memory. At the beginning of data communication, the synchronization frame is stored in one of these memories and this frame is read out of the memory onto a communication channel between the local and remote stations. At the same time, the other memory is used to store the frame that is normally used for data communication. When synchronization is established between the local and remote stations, signal generation shifts from the first memory to the second; and the second memory immediately begins to produce the channel select and overhead signals needed for data communication.

Illustratively, the synchronization frame contains less than one hundred bits and in a preferred embodiment a total of forty-eight bits are used for synchronization. As a result, synchronization can be achieved much more quickly than in systems where three full data frames must be transmitted to achieve synchronization. Moreover, few, if any, of the bits present in the synchronization frame are customer-originated data bits or EIA-type control signals. As a result, the TDM system has control of the contents of the synchronization frame and is able to ensure that the only patterns of bits in the synchronization frame that match those of the frame sync word are indeed those of the frame sync word.

Under these conditions, false synchronization problems are avoided. Finally, to maintain synchronization, the data transmission frame need only contain a single frame sync bit.

BRIEF DESCRIPTION OF THE DRAWINGS

These and other objects, features, elements and advantages of my invention will be more readily apparent from the following description of the best mode for carrying out the invention in which.

BEST MODE FOR CARRYING OUT THE INVENTION

Figure 1:
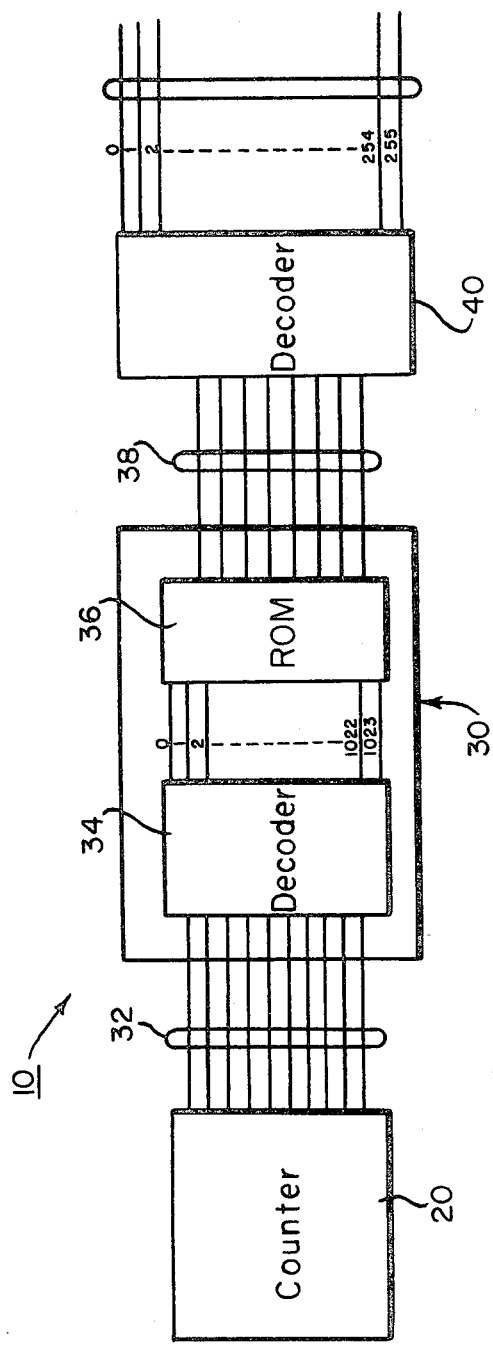
FIG. 1 is a block diagram depicting an illustrative embodiment of a frame generator of the prior art.
Figure 2:
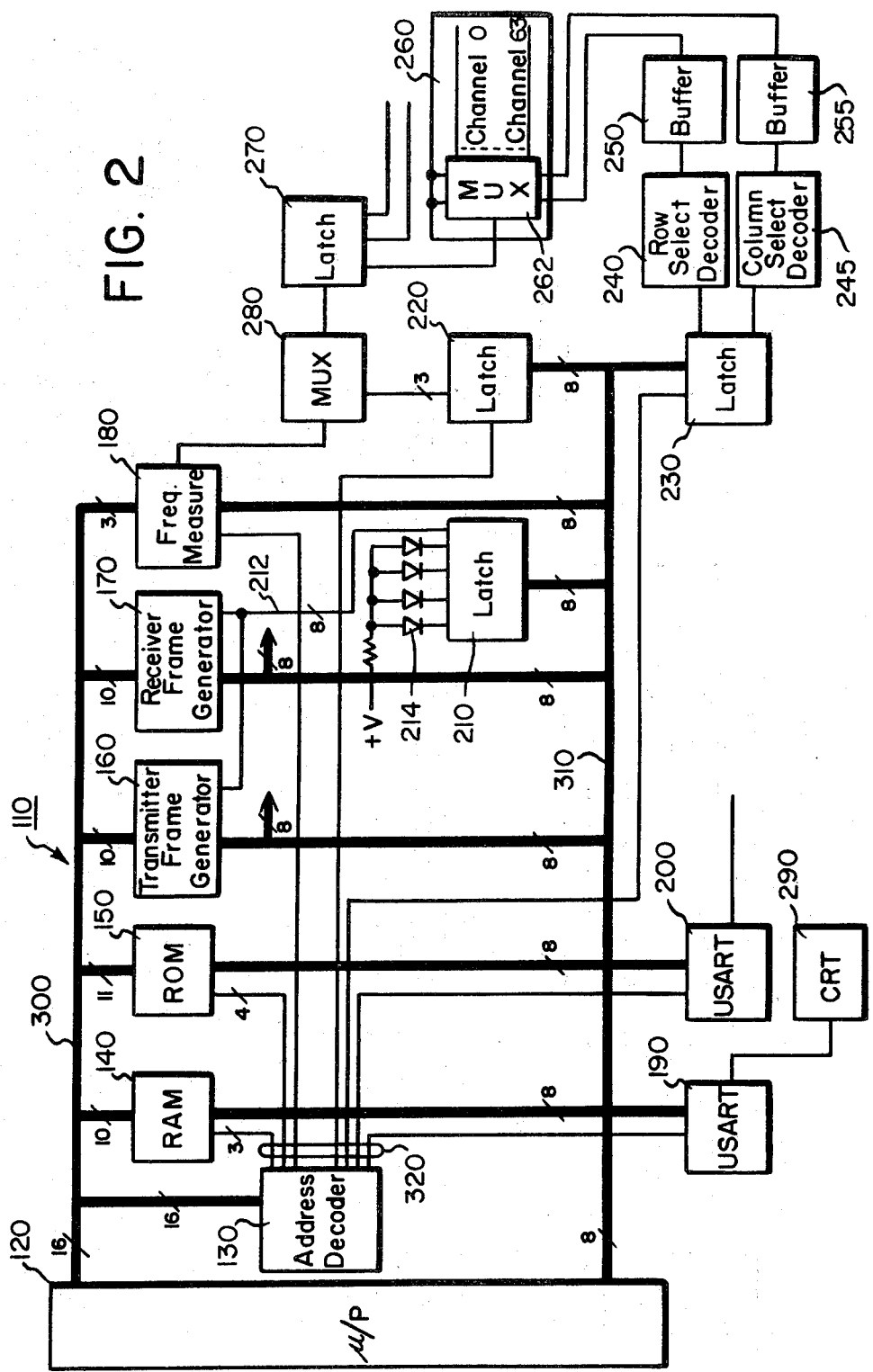
FIG. 2 is a block diagram of portions of a microprocessor-controlled TDM transmitter/receiver used in the practice of the invention.
Figure 3:
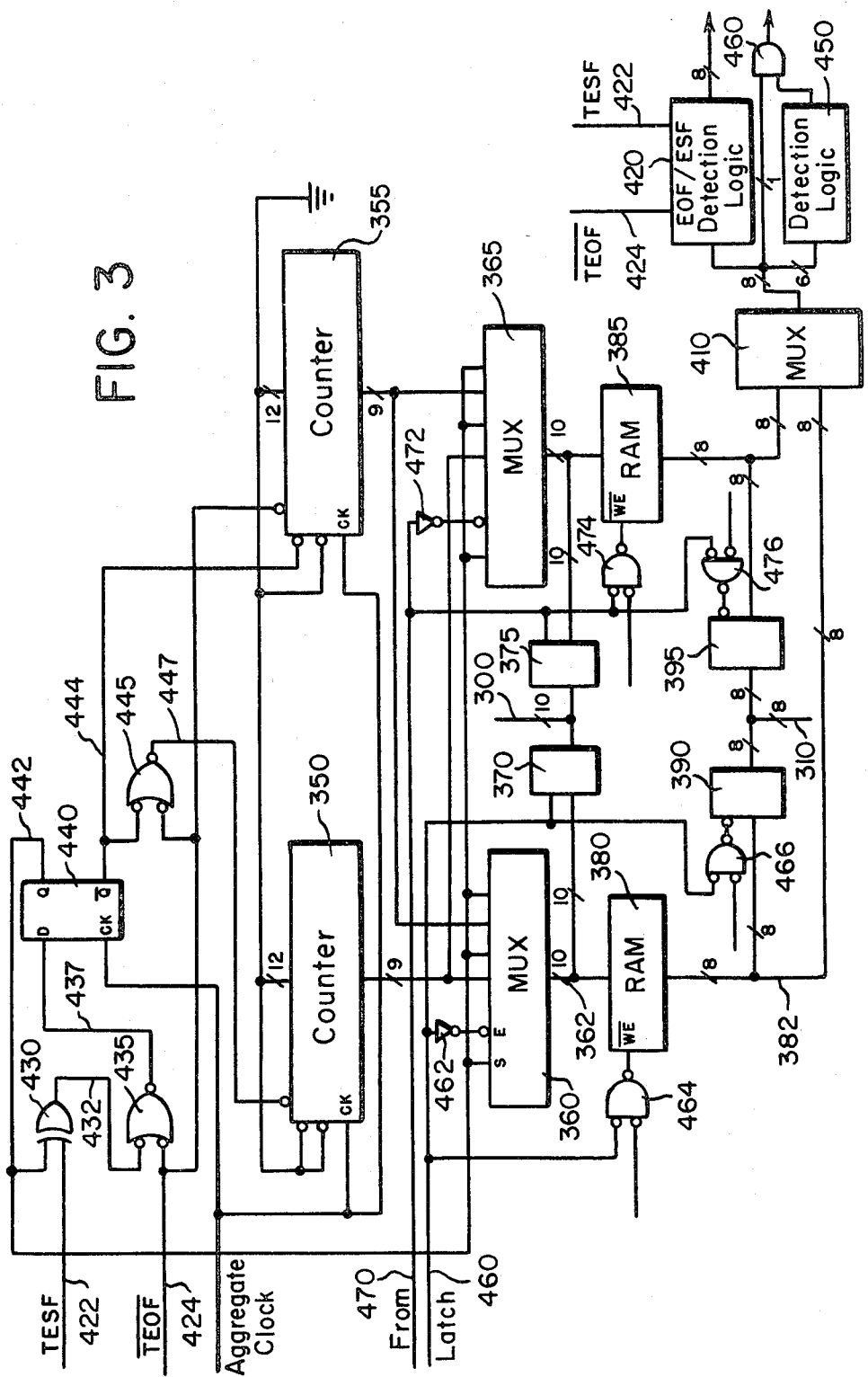
FIG. 3 is a block diagram of a preferred embodiment of a frame generator used in the practice of the invention.

Simplified block diagrams of an illustrative TDM system, a TDM transmitter and a TDM receiver are set forth in FIGS. 1, 2 and 3 respectively, of U.S. Pat. No. 3,632,882 for "Synchronous Programmable Mixed Format Time Division Multiplexer," which is incorporated herein by reference. As shown therein, a plurality of pulse data sources or channels A-X are connected by transmitter multiplexer 100 in time-division multiplex format via a conventional transmission system 101 to a receiver demultiplexer 102 where the interleaved data signals are separated and delivered to appropriate data sinks A-X. Since the pulse repetition rate and the number of bits per character may differ from one source to the next, the data from each source is advantageously stored in a separate buffer register prior to transmission. Data stored in each such register is shifted out by a channel shift clock signal that is applied to the register under control of a channel select signal; and the data signals from the registers are combined by OR gate 210 to produce a composite data signal. Thus the channel select signals determine the particular time slots in the composite data signal which are occupied by data from each channel. In similar fashion at the demultiplexer, channel select signals are supplied to AND gates 300A-300X and to AND gates 301A-301X to select the particular channel into which the shift clock signal shifts the data located at a particular time slot in the composite data signal. As will be appreciated, each station in a TDM system usually comprises both a transmitter and a receiver for two way communication between the stations of the system.

Appropriate channel select signals for the transmitter and the receiver may be generated in many ways. For example, the channel select signals may be stored in a programmable read only memory and the signals may be read out by accessing the individual addresses of the memory serially using a binary counter. Thus, as shown in FIG. 1, a frame generator 10 might comprise a recycling binary counter 20, a memory 30 and a decoder 40. The memory might be a 1KX8 bit memory with ten parallel input lines 32, a 10-line-to-1024 line decoder 34, a read only memory matrix 36 having 1,024 address lines to memory locations which are addressed one at a time and eight parallel binary output lines 38. When the memory is enabled, the signal on the ten input lines is decoded to activate a single address line to the memory matrix. This produces a binary output signal on the eight output lines in accordance with the information stored at the address in the memory matrix. These output lines are then applied to decoder 40 which converts a parallel binary signal on its eight input lines to an output on one of as many as 256 output lines. Of these output lines, some are channel select lines which are used to enable channel select gates in a multiplexer. Such gates are shown as elements 200A-200Z and 201A-201Z in the transmitter multiplexer 100 depicted in FIG. 2 of the U.S. Pat. No. 3,632,882 and elements 300A-300X and 301A-301X in receiver multiplexer 102 of FIG. 3 of that patent. Other output lines are available to enable gates for control and synchronization signaling.

FIG. 2 depicts an illustrative embodiment of a microcomputer 110 which permits the frame to be reconfigured whenever there is a change in the system. This illustrative embodiment comprises a microprocessor 120, an address decoder 130, 3K of random access memory (RAM) 140, 8K of read only memory (ROM) 150, a transmitter frame generator 160, a receiver frame generator 170, and a frequency measurer 180. Further, the apparatus comprises first and second universal synchronous/asynchronous receiver/transmitters 190, 200, latches 210, 220, 230, row select and column select decoders 240, 245, buffers 250, 255, a clock signal source 260, a latch 270, a multiplexer 280, and a cathode ray tube (CRT) display 290. These elements are connected together as shown in FIG. 2 by an address bus 300 and a data bus 310. In addition, the operation of the individual components of the circuit are controlled by control signal lines 320 from address decoder 130. One unit of apparatus 110 is present in each TDM transitter/receiver in the system.

FIG. 3 depicts a preferred embodiment of a frame generator which is used either as the transmitter frame generator 160 or the receiver frame generator 170 in the practice of the invention. The frame generator comprises first and second counters 350, 355, first and second multiplexers 360, 365, first and second address buffers 370, 375, first and second random access memories (RAM) 380, 385, first and second data buffers 390, 395, a multiplexer 410 and EOF/ESF detection logic 420. Further, the apparatus comprises an exclusive OR gate 430, an AND gate 435, a D-type flip-flop 440 and a second AND gate 445 for control of counters 350, 355. Multiplexer 360, address buffer 370, RAM 380 and data buffer 390 constitute a first random access memory unit 400 and multiplexer 365, address buffer 375, RAM 385 and data buffer 395 constitute a second random access memory unit 405 identical to the first. These elements of FIGS. 2 and 3 of the present application are the same as FIGS. 2 and 3 of the above referenced patent application "Automatic Framing in Time Division Multiplexer".

In conjunction with the memory to which they are connected, counters 350 and 355 and control logic 430-445 provide for the generation of a multiplicity of subframes as well as a small number of channel select and overhead signals that are generated once in the frame. Counter 350 is a recycling counter, which in the embodiment shown may count as high as 512 counts before recycling. In a typical frame, counter 350 may be cycled 100 or more times to read sequentially out of one of the random access memories 380, 385 an eight bit parallel output signal on line 382 or 387 to multiplexer 410. Counter 355 is cycled only once during the generation of an entire frame to read sequentially out of a different portion of the memory the channel select and overhead signals stored therein at the addresses defined by the counter. In accordance with a control signal from the microprocessor, multiplexer 410 selects the signals from line 382 or 387 as the output signals to the TDM transmitter/receiver. These signals on line 412 from multiplexer 410 provide the channel select signals and control signals that are used to select data from individual data channels for transmission through the aggregate data channel.

Signal generation shifts back and forth between counters 350 and 355 in accordance with the detection of end-of-subframe (ESF) signals by logic 420. When the end-of-frame (EOF) signal is finally addressed in RAM and detected by logic 420, the signal on line 424 goes low. As a result, a low signal is produced at the load terminals of counters 350 and 355. These signals to the two load terminals cause both counters to be reset upon receipt of the next clock signal; and the apparatus of FIG. 2 is ready to generate the signals for the next frame. Transmitter and receiver frame generators such as described in FIG. 2 can be substituted for transmitter frame generator 130 of FIG. 2 and receiver frame generator 570 of FIG. 7 of the referenced application, "Method and Apparatus for Interleaving Control Signals".

Memories 380, 385 are random access memories which permit different sets of channel select signals to be stored therein so as to generate different frames. As detailed in the application "Automatic Framing in Time Division Multiplexer", the channel select signals are generated by a microprocessor and stored in the memories under control of the microprocessor. The individual channel select signals to be stored are supplied to random access memories 380, 385 by data bus 310 and data buffers 390, 395. The addresses at which the signals are to be stored in RAMs 380, 385 are supplied to the RAMs by address bus 300 and address buffers 370, 375. As a result, by addressing each one of the addresses in RAM 380 or 385, the microprocessor is able to store therein an array of channel select and control signals which define a new frame.

First and second memory units 400, 405 permit the TDM to continue to transmit or receive data while a new frame is being generated and stored in the random access memory. While the addresses generated by counters 350, 355 are being used to read channel select and overhead signals out of one memory unit, the address and data buffers of the other unit are being used to write a new set of channel select and overhead signals into the random access memory of that unit.

Once a new frame is stored in random access memory both in the local station and in the remote station, the system is ready to switch over from the old frame to the new frame. When the end of frame signal in the old frame is detected by logic 420, the signal goes high on the enable line 460 or 470 to the multiplexer of the memory unit in which the new frame is stored. At the same time, multiplexer 410 is switched so that its output now comes from the new memory instead of the old. A signal is also inserted in the aggregate data stream being transmitted to the remote station commanding that station to switch to the new frame as well. As a result of this process, the switchover from old frame to new can be made without interruption of data transmission and without the loss of any data.

In accordance with the present invention, two different frames are used for signaling between the local and remote TDM stations—one to establish synchronization and a second to control normal data communication. At the beginning of data communication, the synchronization frame is stored by microcomputer 110 in one of RAMs 380, 385. Advantageously, this frame is written into RAM 380 or 385 from a portion of read only memory 150. After the frame is stored, its select signals are read out in sequence by addressing the RAM with signals generated by counter 350 or 355.

Illustratively, the pattern of synchronization signals that is transmitted to the remote station may comprise a total of forty-eight bits made up of an eight bit pattern repeated six times. The eight bit pattern may, for example, have the form XXXX 1011 where the last four bits are the frame sync pattern and the other four bits do not have the 1011 pattern of the frame sync pattern. This eight bit pattern may for example be generated from a sequence of eight select signals from RAM 380 or 385 such as that set forth in Table 1.

TABLE 1

| Output Line | | | | | | | | Function |
|---|---|---|---|---|---|---|---|---|
| 7 | 6 | 5 | 4 | 3 | 2 | 1 | 0 | |
| 0 | 0 | 0 | 0 | 0 | 0 | 0 | 0 | channel 0 select |
| 1 | 1 | 0 | 0 | 0 | 0 | 0 | 0 | frame A/B |
| 1 | 1 | 0 | 0 | 0 | 0 | 0 | 1 | remote out of sync |
| 1 | 1 | 0 | 0 | 0 | 1 | 0 | 1 | remote loopback |
| 1 | 1 | 1 | 1 | 0 | 0 | 0 | 1 | frame sync bit high |
| 1 | 1 | 1 | 1 | 0 | 0 | 0 | 0 | frame sync bit low |
| 1 | 1 | 1 | 1 | 0 | 0 | 0 | 1 | frame sync bit high |
| 1 | 1 | 1 | 1 | 1 | 0 | 0 | 1 | frame sync bit high and end of frame |

When these select signals from RAM 380 or 385 become available on line 412, the critical bits of each select signal are tested in parallel by conventional logic means for the presence of particular bit patterns identifying different types of select signals. Of particular interest to the present invention, as shown in FIG. 3, six of the eight bit parallel select signals are tested by frame sync select signal detection logic 450 to determine if they call for the transmission of a frame sync bit. If the pattern representative of a frame sync bit is detected by logic 450, gate 460 is enabled. The other input to gate 460 is the lowest output line from multiplexer 410 which as shown in Table 1 is either high or low depending on whether the frame sync bit is high or low. As a result, when AND gate 460 is enabled, either a high or a low frame sync bit is produced by the select signals stored in RAM 380 or 385 and is made available to the TDM transmitter/receiver for transmission to the remote station.

Figure 4:
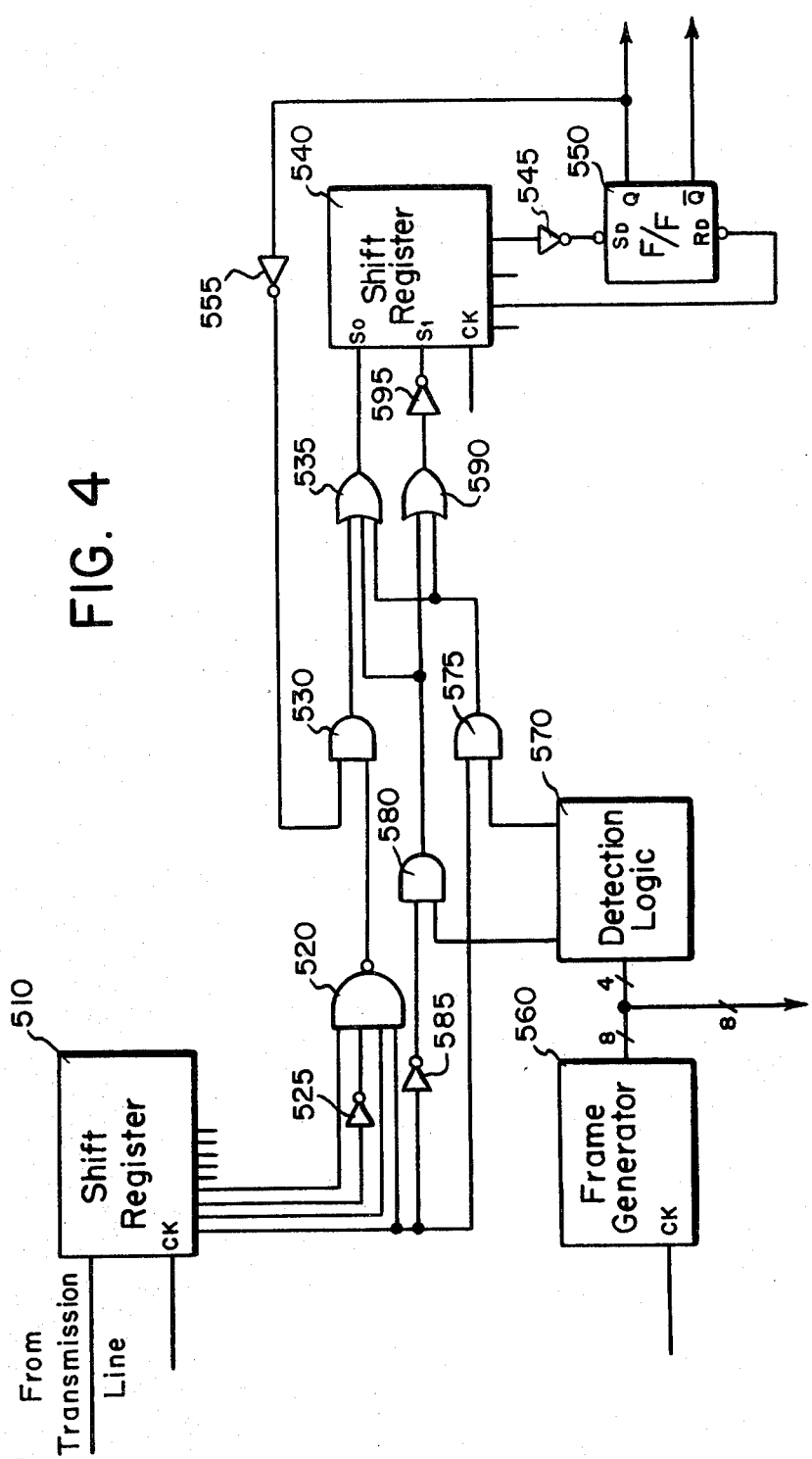
FIG. 4 is a block diagram of an illustrative embodiment of portions of a TDM receiver used in the practice of the invention.

The frame sync word is detected at the remote station by apparatus such as that shown in FIG. 4. This apparatus comprises a first shift register 510, a NAND gate 520, an inverter 525, an AND gate 530, an OR gate 535, a second shift register 540, a latch 550 and inverters 545, 555. In addition, it comprises a frame generator 560, a frame sync select signal detection logic 570, AND gates 575, 580, inverters 585, 590 and an OR gate 595. Illustratively, register 510 is a 164-type eight bit shift register, register 540 is a 194-type four bit shift register and latch 550 is a 74-type D flip-flop.

Under control of clock signals derived from the received signals, the received signals are shifted through shift register 510. NAND gate 520 and inverter 525 test for the presence of the frame sync pattern 1011 in the received signal. In the absence of synchronization, AND gate 530 is enabled and there is a low input to terminal $S_1$ of register 540. Hence, upon detection of the frame sync pattern, there is a high input to terminal $S_0$ of register 540; and upon receipt of the next clock signal, a bit is shifted by one to the right in shift register 540. Illustratively, the shift register is pre-loaded with one bit. As a result, as soon as three such frame sync patterns are detected by NAND gate 520 and three such shifts are made in register 540, the signals on the lines to the $S_D$ and $R_D$ terminals of latch 550 become low and high respectively. For these signals the output from the Q terminal of latch 550 is high. The signal from the Q output of latch 540 is used in known fashion at the receiver to condition the receiver for the receipt of data signals and it is returned to the local station to indicate that sync has been achieved. The high signal is also inverted in inverter 555 to disable AND gate 530. Advantageously, the sync pattern is sent at least six times so that synchronization can be achieved even if as many as three frame sync patterns are altered during transmission.

While synchronization is being established, a frame that is suitable for data transmission is being written at the transmitter into the random access memory 380, 385 which is not being used to generate the synchronization frame. To maximize data transmission, this frame contains a preponderance of select signals for the transmission of data and relatively few overhead signals. In standard practice at least 95% of the bandwidth of the frame is devoted to the transmission of data. Advantageously, however, once synchronization is established, the signal that is used in the present invention to maintain synchronization can be as little as a single bit per frame, thereby making it possible to achieve data transmission efficiencies well in excess of 99%.

The same data transmission frame that is used by the transmitter is also used at the receiver frame generator 560. Advantageously, both the transmitter frame and the receiver frame are bit interleaved frames generated by the TDM equipment in accordance with the teaching of the above referenced "Automatic Framing in Time Division Multiplexer".

When the local station receives from the remote station the signal indicating that synchronization has been achieved, it is ready to commence transmission of data signals in accordance with the data transmission frame. To accomplish this, the microprocessor produces a high signal on the enable line 460 or 470 to the multiplexer of the memory unit 380, 385 in which the transmission frame is stored. At the same time multiplexer 410 is switched so that its output now comes from the memory unit in which the transmission frame is stored. A signal is also inserted in the aggregate signal being transmitted to the remote station commanding the remote station to switch to the transmission frame as well. As a result of this process, the switchover from old frame to new frame can be made without the loss of any data.

When the receiver switches over the the transmission frame, frame generator 560 begins to generate the same sequence of eight bit select signals that are being generated at the transmitter. One or more of these select signals are frame sync select signals. At the transmitter, detection logic 450 and gate 460 are used to generate a frame sync high or frame sync low bit as detailed above in the description of the generation of the synchronization pattern. At the receiver, the presence of the frame sync select signals in the eight bit parallel output from generator 560 is detected by logic 570 and used to enable gate 575 or gate 580 depending on whether the received frame sync bit is to be high or low. If the appropriate bit is detected, the signal to the $S_0$ input of shift register 540 will be high and that to the $S_1$ input will be low. As a result, the shift register will shift one bit to the right, thereby maintaining the same output indicative of synchronization.

If the appropriate bit is not detected, the signal to the $S_0$ input will be low and that to the $S_1$ input will be high, causing the shift register to shift left. With the first shift, the line to terminal $S_D$ of latch 550 goes high but the latch does not change its output. If, however, the sync bit is not detected three times in a row, three left shifts will cause the signal on the line to terminal $S_D$ to be high and that on line $R_D$ to be low, whereupon latch 550 changes state. The signal from latch 550 then indicates that the receiver is out of sync and the process of establishing sync must be repeated.

The number of frame sync bits that are used in the transmission frame can be varied to suit the circumstances. Obviously, there must be one such bit and if the system operator can accept relatively long delays in detecting an out-of-sync condition, one frame sync bit per frame will suffice. Where long frames are used, it may be more practical to use two or more frame sync bits per frame.

The synchronization frame and the transmission frame may be stored in the read only memory of the microcomputer and may be read out of this memory and into random access memory for use in generating the select signals for synchronization, other overhead and data transmission. Preferably, in accordance with the teaching in the above referenced "Automatic Framing in Time Division Multiplexer", the transmission frame can be calculated by the microprocessor using the data rates of the individual data channels and the aggregate channel and this frame can be written by the microprocessor into the random access memory. In still another possibility, the select signals of the synchronization frame and/or the transmission frame can be read directly out of the read only memory in order to generate these frames.

Illustratively, the synchronization frame contains less than 100 bits and in a preferred embodiment a total of 48 bits are used for synchronization. As a result, synchronization can be achieved much more quickly than in systems where three full data frames of perhaps thousands of bits each must be transmitted to achieve synchronization. In addition, the synchronization frame contains little or no customer generated signals such as data or EIA control signals; and those signals which are not part of the frame sync pattern are selected and ordered within the frame so that there is no circumstance under which such signals would mimic the frame sync pattern. In the eight bit pattern that is generated in accordance with the select signals of Table 1, one bit of data may be transmitted in lieu of the channel zero select signal without risk of false synchronization. Depending on the signals transmitted during frame synchronization, their order and the size and pattern of the frame sync pattern, it may be possible to transmit even more customer generated signals within each repeating portion of the synchronization frame. In general, however, the number of customer generated signals must be less than the length of the frame sync pattern, since there is no way to control the pattern of the customer generated signals.

Once synchronization is established, synchronization may be maintained without the use of an elaborate frame synchronization pattern. One bit per frame is enough to assure the operator that synchronization is being maintained. While it may be desirable to use more than one frame sync bit to increase the speed with which an out-of-sync condition is detected, significant increases in data transmission efficiency can still be achieved by the use of fewer sync bits than are used in the frame synchronization pattern that is used to establish synchronization initially.

Numerous modifications to the above described invention will be apparent to those skilled in the art. Of particular note, the two memories 380, 385 may be implemented in physically separate devices or they may be different parts of a partitioned memory. References in the claims to two memories will be understood to apply both to two physically separate memories and to two portions of a partitioned memory.

What is claimed is:

1. In a time division multiplexer for multiplexing data and control signals from a plurality of individual data channels so as to produce a single stream of signals on an aggregate transmission line, said multiplexer including a frame generator which generates select signals that are used to select for transmission either data from individual data channels or overhead signals including synchronization signals, a method of synchronizing a local and a remote station by transmission of frame synchronization signals comprising the steps of:
   generating a first frame which provides for the transmission of a frame synchronization pattern at least twice and contains no customer-generated signals that are as long as said frame synchronization pattern,
   transmitting signals from said local station to said remote station in accordance with said first frame until frame synchronization is established,
   generating a second frame of longer duration than the first frame which provides for the transmission of a preponderance of data signals and at least one frame synchronization signal, and
   transmitting signals from said local station to said remote station in accordance with said second frame after frame synchronization is established.

2. The method of claim 1 wherein the steps of generating said first and second frames comprise the step of reading a sequence of select signals out of a memory in which said sequence is stored.

3. The method of claim 1 wherein said step of generating said first frame comprises the steps of writing a sequence of select signals into a first memory and then reading said sequence from said memory.

4. The method of claim 1 or claim 3 wherein said step of generating said second frame comprises the steps of writing a sequence of select signals into a second memory and then reading said sequence from second said memory.

5. The method of claim 1 or claim 3 further comprising the steps of detecting the presence of said synchronization pattern in the stream of signals received at the remote station, producing a signal indicating that frame synchronization has been achieved when said synchronization pattern is detected at least twice, and transmitting to the local station from the remote station a signal indicating that frame synchronization has been achieved, whereupon signals are transmitted from said local station to said remote station in accordance with said second frame.

6. The method of claim 1 wherein the number of bits in said second frame that are used for frame synchronization is less than the number of bits in the frame synchronization pattern of said first frame.

7. The method of claim 1 wherein a single bit is used for frame synchronization in said second frame.

8. In a time division multiplexer for multiplexing data and control signals from a plurality of individual data channels so as to produce a single stream of signals on an aggregate transmission line, said multiplexer including a frame generator which generates select signals that are used to select for transmission either data from individual data channels or overhead signals including synchronization signals, apparatus for synchronizing a local and a remote station by transmission of frame synchronization signals comprising:
   means for generating a first frame which provides for the transmission of a frame synchronization pattern at least twice and contains no customer-generated signals that are as long as said frame synchronization pattern,
   means for transmitting signals from said local station to said remote station in accordance with said first frame until frame synchronization is established,
   means for generating a second frame of longer duration than the first frame which provides for the transmission of a preponderance of data signals and at least one frame synchronization signal, and
   means for transmitting signals from said local station to said remote station in accordance with said second frame after frame synchronization is established.

9. The apparatus of claim 8 wherein said means for generating said first and second frames comprises at least one memory in which said frames are stored and means for addressing storage locations of said memory sequentially.

10. The apparatus of claim 8 wherein:
    said means for generating said first and second frames further comprises:
      a first memory in which said first frame is stored,
      a second memory in which said second frame is stored, and
      means for addressing storage locations in said first and second memories to read out signals therefrom, and
    said means for transmitting signals in accordance with said first frame and said second frame comprise means for using the signals read out from said first memory to control transmission from said local station to said remote station until frame synchronization is established and means for using the signals read out from said second memory to control transmission from said local station to said remote station after frame synchronization is established.

11. The apparatus of claim 9 wherein the memory in which said second frame is stored is a random access memory and said generating means comprises means for writing a sequence of select signals into said random access memory and for addressing storage locations of said memory sequentially.

12. The apparatus of claim 8 further comprising:

means for detecting the presence of said synchronization pattern in the stream of signals received at the remote station, means for producing a signal indicating that frame synchronization has been achieved when said synchronization pattern is detected at least twice, and means for transmitting to said local station from said remote station a signal indicating that frame synchronization has been achieved, whereupon signals are transmitted from said local station to said remote station in accordance with said second frame.

13. The apparatus of claim 8 wherein the number of bits in said second frame that are used for frame synchronization is less than the number of bits in the frame synchronization pattern of said first frame.

14. The apparatus of claim 8 wherein a single bit is used for frame synchronization in said second frame.

15. In a time division multiplexer for multiplexing data and control signals from a plurality of individual data channels so as to produce a single stream of signals on an aggregate transmission line, said multiplexer including a frame generator which generates select signals that are used to select for transmission either data from individual data channels or overhead signals including synchronization signals, a method of synchronizing a local and a remote station by transmission of frame synchronization signals comprising the steps of:

generating a first frame having select signals that provide for the transmission of a frame synchronization pattern at least twice and no customer-generated signals that are as long as said frame synchronization pattern, transmitting signals from said local station to said remote station in accordance with the select signals of said first frame until frame synchronization is established, generating a second frame of longer duration than the first frame having select signals that provide for the transmission of a preponderance of data signals and at least one frame synchronization signal, and transmitting signals from said local station to said remote station in accordance with the select signals of said second frame after frame synchronization is established.

16. In a time division multiplexer for multiplexing data and control signals from a plurality of individual data channels so as to produce a single stream of signals on an aggregate transmission line, said multiplexer including a frame generator which generates select signals that are used to select for transmission either data from individual data channels or overhead signals including synchronization signals, apparatus for synchronizing a local and a remote station by transmission of frame synchronization signals comprising:

means for generating a first frame having select signals that provide for the transmission of a frame synchronization pattern at least twice and no customer-generated signals that are as long as said frame synchronization pattern, means for transmitting signals from said local station to said remote station in accordance with the select signals of said first frame until frame synchronization is established, means for generating a second frame of longer duration than the first frame having select signals that provide for the transmission of a preponderance of data signals and at least one frame synchronization signal, and means for transmitting signals from said local station to said remote station in accordance with the select signals of said second frame after frame synchronization is established.

17. The apparatus of claim 9 wherein said memory is a random access memory and said generating means further comprises means for reading out of a read only memory a sequence of signals that define said first frame and for writing said sequence into said random access memory.

18. The apparatus of claim 16 wherein the select signals of said first frame are stored in a read only memory.

19. The apparatus of claim 16 wherein:

said means for generating said first and second frames further comprises:
 a first memory in which the select signals of said first frame are stored,
 a second memory in which the select signals of said second frame are stored, and
 means for addressing storage locations in said first and second memories to read out select signals therefrom, and said means for transmitting signals in accordance with the select signals of said first frame and said second frame comprise means for using the select signals read out from said first memory to control transmission from said local station to said remote station until frame synchronization is established and means for using the select signals read out from said second memory to control transmission from said local station to said remote station after frame synchronization is established.

* * * * *

UNITED STATES PATENT AND TRADEMARK OFFICE
CERTIFICATE OF CORRECTION

PATENT NO. : 4,450,558
DATED : May 22, 1984
INVENTOR(S) : Dean A. Hampton, et al.

It is certified that error appears in the above—identified patent and that said Letters Patent is hereby corrected as shown below:

Column 9, line 59, after "from," "second said" should read -- said second --

Signed and Sealed this

Twenty-third Day of October 1984

[SEAL]

Attest:

Attesting Officer

GERALD J. MOSSINGHOFF

Commissioner of Patents and Trademarks